(12) United States Patent
Benson et al.

(10) Patent No.: US 7,097,936 B2
(45) Date of Patent: Aug. 29, 2006

(54) BATTERY CONSTRUCTED WITH EXTRACTED BICELLS STACKED ON SHUTTLED PALLET

(75) Inventors: Morgan Rey Benson, Indianapolis, IN (US); Robert Thomas Wendling, Anderson, IN (US); Bruce Everett Lasley, Fishers, IN (US)

(73) Assignee: Enerdel, Inc., Fort Lauderdale, FL (US)

( * ) Notice: Subject to any disclaimer, the term of this patent is extended or adjusted under 35 U.S.C. 154(b) by 96 days.

(21) Appl. No.: 09/940,164

(22) Filed: Aug. 27, 2001

(65) Prior Publication Data

US 2003/0037431 A1 Feb. 27, 2003

(51) Int. Cl.
*H01M 10/04* (2006.01)

(52) U.S. Cl. .................... 429/161; 429/304; 429/211
(58) Field of Classification Search ................ 429/161, 429/304, 211, 730, 623.1
See application file for complete search history.

(56) References Cited

U.S. PATENT DOCUMENTS

| 4,342,342 | A | 8/1982 | Wheadon ............... 141/1.1 |
| 6,348,283 | B1 * | 2/2002 | Mas et al. ............... 429/161 |
| 6,368,743 | B1 | 4/2002 | Guerin et al. |
| 6,406,815 | B1 | 6/2002 | Sandberg et al. |
| 6,413,668 | B1 | 7/2002 | Sandberg et al. |
| 6,467,156 | B1 * | 10/2002 | Velasquez et al. ........... 29/730 |

* cited by examiner

*Primary Examiner*—Michael Barr
*Assistant Examiner*—Monique Wills
(74) *Attorney, Agent, or Firm*—Howard & Howard Attnys.

(57) ABSTRACT

A method of constructing a battery using a control unit to cause pallets on an automated conveyor system to move between indexed positions on the conveyor system. Control unit causes terminals to be deposited on said pallet in a first position, control unit causes pallet to be moved to a second position, and a delivery mechanism controlled by control unit deposits bicells on said terminals with use of an alignment plate, said alignment plate on a separate circulating conveyor, controlled by control unit. Bicells are aligned to be in electrical contact with said terminals.

16 Claims, 5 Drawing Sheets

Fig. 8

BATTERY CONSTRUCTED WITH EXTRACTED BICELLS STACKED ON SHUTTLED PALLET

RELATED APPLICATIONS

This application is related to U.S. application Ser. No. 09/940,116 entitled "APPARATUS FOR IN-LINE EXTRACTION, ACTIVATION AND SEALING OF A STORAGE BATTERY," assigned to common assignee of present invention, filed of even date herewith, Aug. 27, 2001, hereby incorporated by reference in its entirety.

BACKGROUND OF THE INVENTION

1. Technical Field

The present invention relates to processes for constructing storage batteries.

2. Description of the Related Art

Current construction methods of storage batteries involve using fixtures and human labor to build a battery from its component parts. U.S. Pat. No. 4,342,342 issued to Wheadon shows battery plates transferred from a shingling conveyor where the plates had been stacked together in shingle-like fashion, and then scooped up into groups by an operator and hand-stacked onto a pallet. These types of production are disadvantageous for several reasons. One of the problems is that they are inefficient because of the amount of labor involved to correctly put components together to create the final battery. In the context of producing a Lithium polymer (LiPo) battery, a plurality of bicells are stacked by hand in a fixture and welded to each other, and to positive and negative terminals. Another problem involves alignment. If the bicells are not aligned with each other and to the terminal, the final product may be compromised. Yet another problem is that these methods are costly because of the time involved, the labor involved, and the inaccuracies that result in reduced quality.

There is therefore a need for an improved process of building batteries that minimize or eliminate one or more of the problems set forth above.

SUMMARY OF THE INVENTION

It is an object of the present invention to provide a solution to one or more of the above mentioned problems. In one aspect of the invention, an automatic conveyor system controlled by a control unit is provided to construct a storage battery. One advantage of this system is that the amount of manual labor required to construct storage batteries is reduced because the batteries can be constructed by an automated mechanism. Another advantage of this system of an automated mechanism is the reduction of time in building the battery.

According to a first aspect of the invention, a method for assembling a battery is provided, wherein terminals of a battery are deposited on a pallet at a first position, the pallet is moved to a second position along a conveyor system and the terminals are contacted with one or more bicells in the second position.

In a preferred embodiment, an alignment plate is provided for use in cooperation with the pallet. An opening in the pallet allows the alignment plate to be received therein. The alignment plate, itself, is configured in size and shape to receive and locate the bicells with respect to the terminals (which are on the pallet). This cooperation of pallet and alignment plate allows bicells to be deposited quickly and accurately with respect to the terminals such that an electrical connection is made. One advantage of this configuration of the pallet and alignment plate is the improved accuracy of building the battery from the component parts, thereby improving quality of batteries constructed. Another advantage is the reduction of the time involved to build a battery inasmuch as it lends itself to complete automation. In still a further preferred embodiment, the alignment plates are on a recirculating conveyor to be shuttled from the pallets once the bicells have been deposited.

An apparatus for assembling a battery is also presented.

Other features, objects, and advantages will become apparent to one of ordinary skill from the following detailed description and accompanying drawing illustrating the invention by way of example but not by way of limitation.

DETAILED DESCRIPTION OF THE PREFERRED EMBODIMENTS

Figure 1:
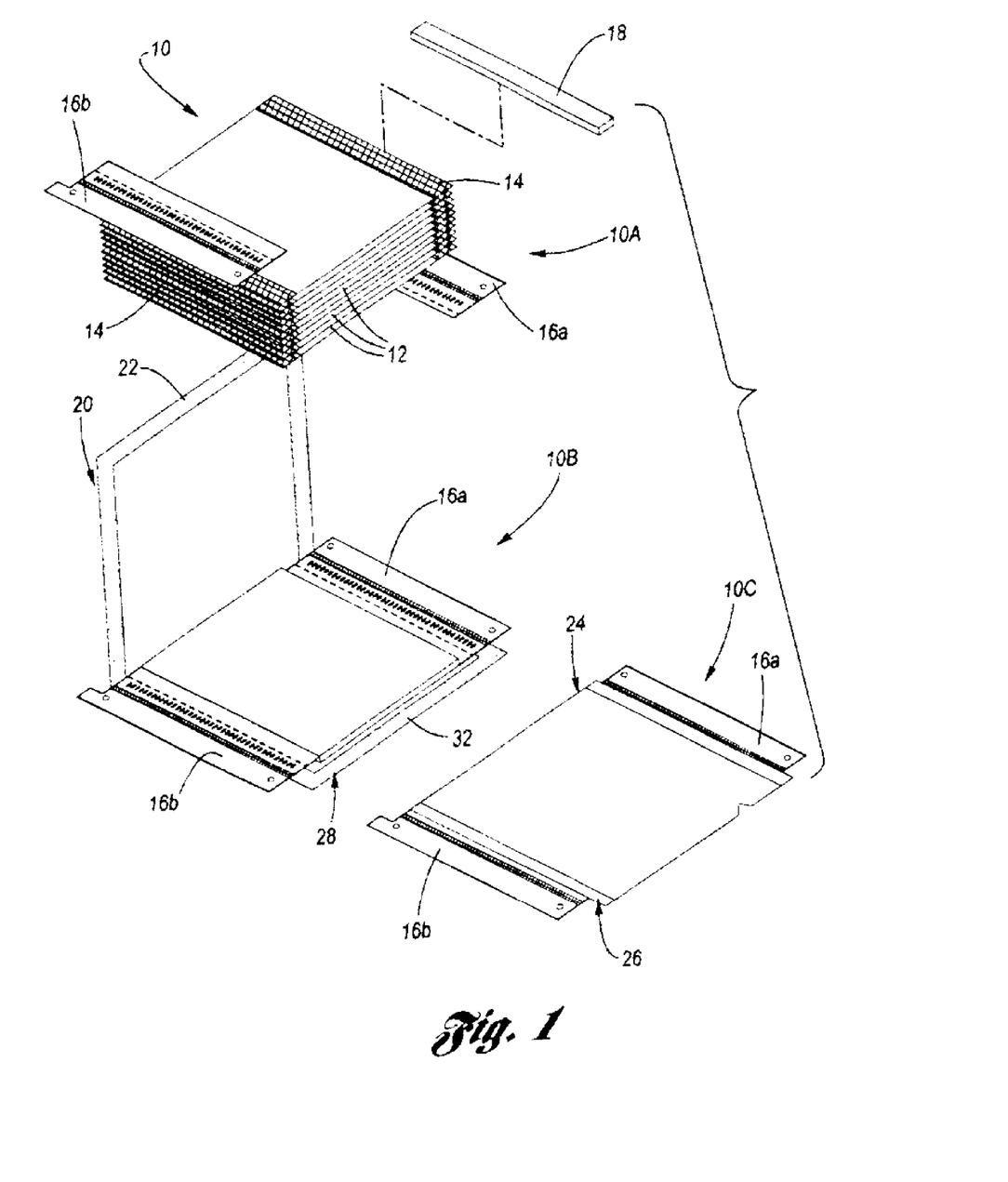
FIG. 1 is a perspective view of a storage battery of the type that can be made by a process according to the invention.

Referring now to the drawings wherein like reference numerals are used to identify identical components in the various views, FIG. 1 illustrates a storage battery 10, in various stages of construction, that may be constructed using the improved automated system. To fully appreciate the advantages of the present invention, a brief description of the product made thereby, and its component parts will be set forth. The battery 10 may be connected with other batteries or may be used as an individual unit. It may be used for portable or stationary electrical and/or electronic devices. An exploded view of an initial phase of construction is designated $10_A$, an intermediate phase of construction is designated $10_B$, and a completed phase of construction is designated $10_C$. FIG. 1 shows a plurality of bicells 12 with exposed conductive grids 14, positive and negative terminals $16_a$, $16_b$, a cover strip 18, and packaging 20 with hot melt adhesive layer 22 along the edges 24, 26, 28 of packaging.

Bicells 12 may comprise conventional bicells known to those of ordinary skill in the art, for example as seen by reference to U.S. Pat. No. 6,063,519, issued to Barker, et al., hereby incorporated by reference. In the illustrated embodiment, a plurality of bicells 12 are connected in a parallel electrical relationship. Exposed grids 14 are current carriers. One manufacturing challenge, thereof, lies with aligning the plurality of bicells so the respective grids are in substantial registry. When done manually, as presently done in the art, such registration tasks are tedious, inexact, and time consuming, even with the aid of a fixture. Failure to align could cause performance problems. Also, keeping alignment until welding is difficult.

Cover strip 18 is make of the same material as the corresponding terminal (positive or negative) $16_a$, $16_b$ and is placed above grids 14 or below grids 14, dependent upon whether terminals $16_a$, $16_b$ are welded above or below grids 14. Use of cover strip 18 aids in ultrasonic welding of exposed grids 14 to terminals $16_a$, $16_b$ because it protects the relatively fragile exposed grids 14 during the welding.

Bicells 12 are enclosed in packaging 20. Packaging 20 may comprise a single sheet which is folded to enclose bicells 12. Packaging 20 may be a type of laminated, aluminized flexible material which contains four layers. The outside layer exposed to the environment is an electrical insulating material, for example, a polyester. The next underlying layer is metallic, for example, aluminum. This metallic layer reduceds or eliminates the amount of moisture outside of packaging 20 to which the battery is exposed (i.e., provides a bidirectional moisture barrier). The third layer is of the same material as the outside layer. The fourth layer, layer 22, comprises an adhesive such as a conventional sealing hot melt adhesive, for example, ethylene acrylic acid (EAA). In one embodiment, a part of a sheet of packaging 20 is placed under battery 10 and a remaining part of the packaging 20 is folded over bicells 12 such that hot melt adhesive layer 22 may come in contact with itself at a first end 24, a second end 26, and the edge 28 opposite the packaging fold.

In the illustrated embodiment shown in FIG. 1, terminal $16_b$ is placed above the plurality of bicells 12, while terminal $16_a$ is placed below the plurality of bicells 12. In a preferred embodiment, terminals $16_a$, $16_b$ are located in the same plane (either both placed above the plurality of bicells 12 or placed below the plurality of bicells 12. This arrangement is preferred because it eases manufacturing, as will be described in detail below. Overall, aligning the bicells 12 with each other, and the "stack" so formed with terminals $16_a$, $16_b$, presents manufacturing challenges. The invention overcomes these and other problems.

Figure 2:
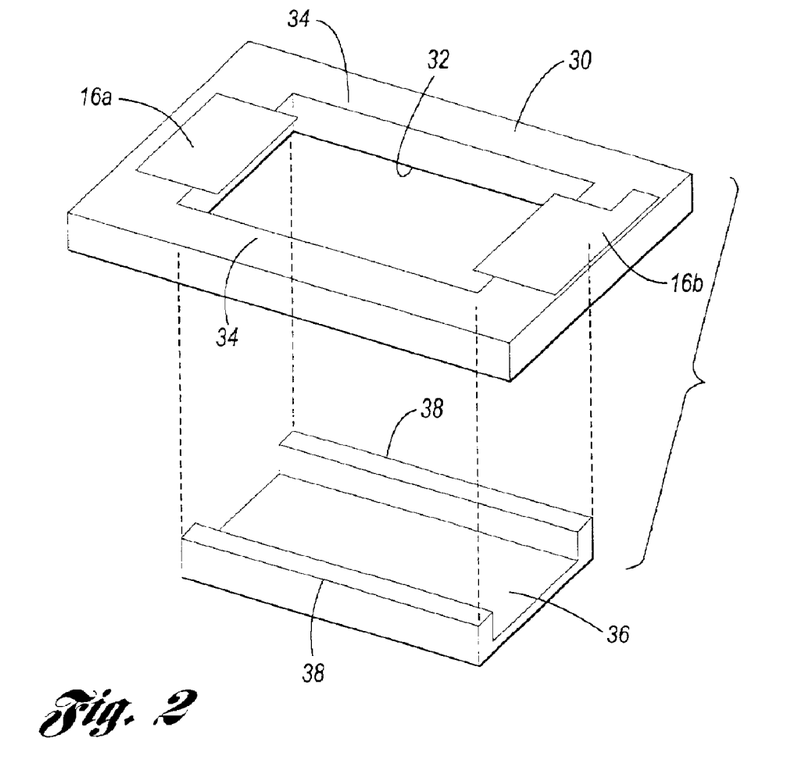
FIG. 2 is a perspective view of a pallet and an alignment plate configured to receive bicells according to the invention.

Before proceeding to a detailed description of the inventive system, a general description of the main portion thereof will be set forth, namely a pallet 30 and a mating alignment plate 36. In this regard, FIG. 2 illustrates a pallet 30 of the inventive conveyor system method of constructing batteries 10 and the alignment plate 36 configured to fit with pallet 30 to deposit bicells 12. Pallet 30 may be a block of insulative material, such as wood, with an opening 32 in the center. Alignment plate 36 may be composed of insulative material and is a U-shaped plate, thereby having a rectangular shaped or square shaped depression and two "legs" raised above the surface of the depression. The width between the inside surfaces of the legs is substantially equal to the width of bicells 12 for the purpose of aligning bicells 12. It should be appreciated bicells 12 have a relative amount of flex. Alignment plate 36 is configured to be disposed in opening 32 and moved relative thereto such that edges 38 of top surface of alignment plate 36 are elevated above edges 34 of pallet 30. This receiving position of the alignment plate 36 allows an accurate alignment of bicells 12 onto plate 36 and for the grids 14 to be in contact with terminals $16_a$, $16_b$.

Figure 3:
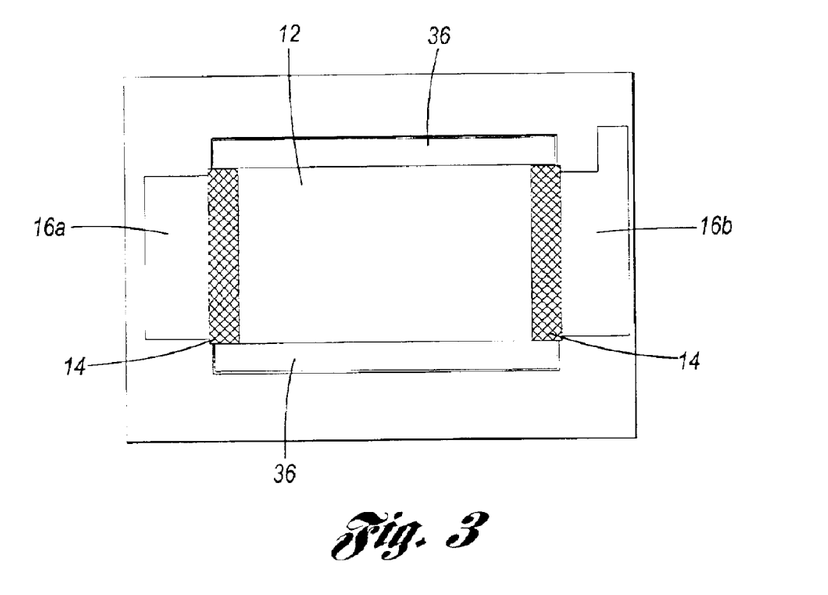
FIG. 3 is the top view of the pallet and alignment plate of FIG. 2 that allows placing of bicells in contact with the battery terminals.

FIG. 3 illustrates the top view of pallet 30 with alignment plate 36 located in pallet opening 32 in the receiving position. In the receiving position, bicells 12 may be deposited and aligned accurately over terminals $16_a$, $16_b$ (as well as with each other). Bicell exposed grids 14 will be aligned with portion of terminal to be welded together such that electrical connection is achieved. The footprint of a bicell 12 is overlaid and is show in phantom line format. By cooperating together, alignment plate 36 and pallet 30 form an accurate and less expensive method of manufacture of battery 10 by aiding in the accuracy of depositing bicells 12 in contact with terminals $16_a$, $16_b$. Both the amount of labor time and potential for human error are reduced is reduced by this arrangement.

Figure 4:
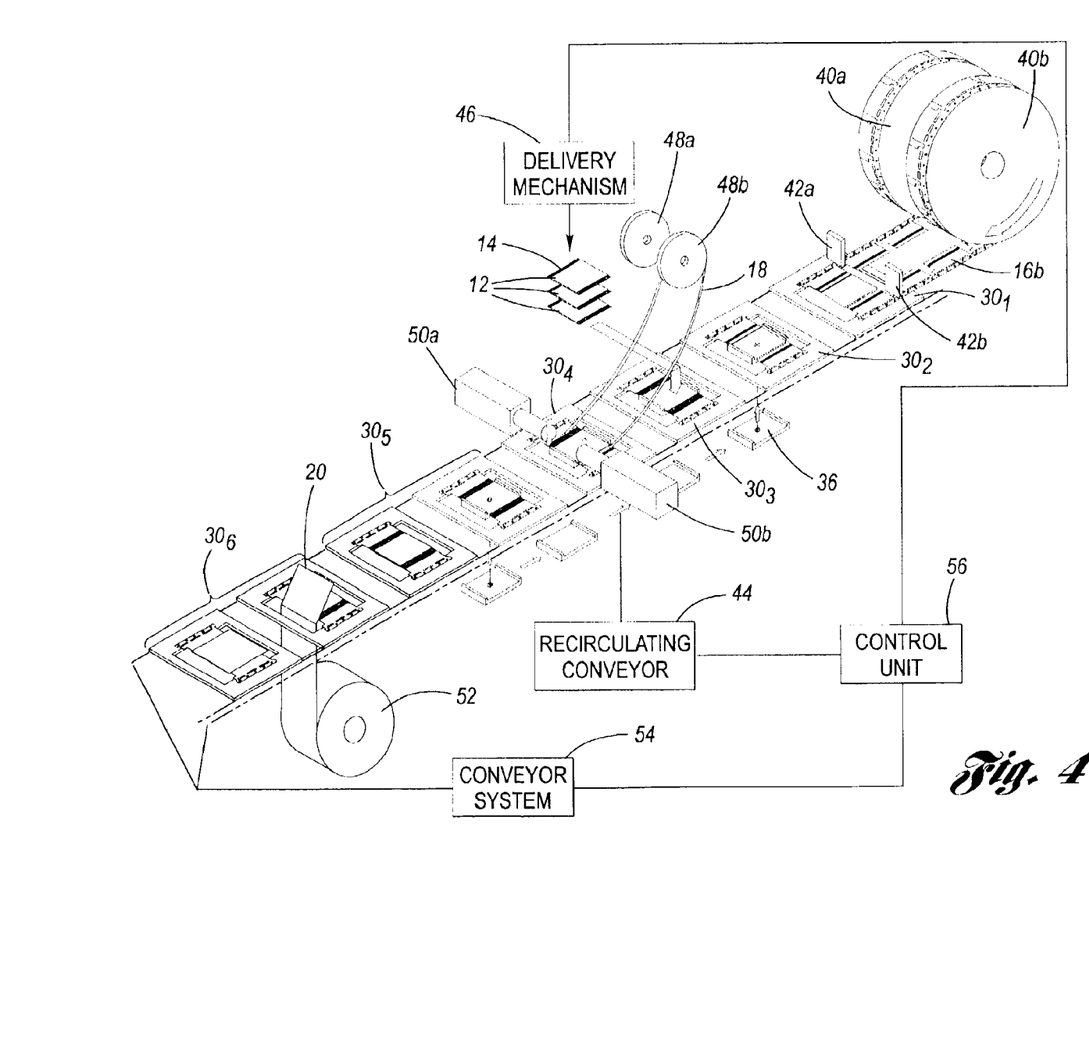
FIG. 4 is a perspective view of a first portion of a preferred embodiment for producing storage batteries according to the invention.

FIG. 4 illustrates an embodiment of the overall automatic conveyor system 54 and the pallet positions $30_n$ (where n is an integer ranging from one to eleven in the illustrated embodiment) involved in the construction process. Conveyor system 54, controlled by control unit 56, moves each pallet 30 along conveyor a predetermined distance marked by index points (not shown) through set of positions $30_n$. The number of pallets 30 on the conveyor system 54 is equal to at least the number of positions $30_n$. At each position $30_n$, a function will be performed, controlled by control unit 56. This indexing function aids in the accuracy and efficiency of the battery 10 construction process. It provides tracking of the various stages of the process and accuracy with which the batteries 10 are constructed because pallets 30 are located at exact positions $30_n$ by use of predetermined index points.

Conveyor system 54, controlled by control unit 56, moves pallet 30 to first pallet position $30_1$. At this position $30_1$, terminals $16_a$, $16_b$ (attached to a carrier backing film 17 which may be composed of a Mylar substrate) may be unwound from reels $40_a$, $40_b$ onto opposing sides of pallet 30. Reels $40_a$, $40_b$ may be replaced with a single larger reel having two wound strips of terminals attached to carrier backing along the edges of the larger reel. Control unit 56, cooperating with conveyor system 54 and reels $40_a$, $40_b$, defines a means for depositing terminal in first position $30_1$.

Prior to conveyor system 54, controlled by control unit 56, moving pallet 30 into second pallet position $30_2$, terminals $16_a$, $16_b$ may be cut from the roll by a cutting means $42_a$, $42_b$, controlled by control unit 56, which separates terminals $16_a$, $16_b$ from subsequent terminals unwound from reels $40_a$, $40_b$.

Conveyor system 54, controlled by control unit 56, defines the means that moves pallet 30 to second pallet position $30_2$. At second pallet position $30_2$, alignment plate 36 is moved into receiving position illustrated in FIG. 3 by recirculating conveyor 44 wherein alignment plate 36 is located in pallet opening 32.

Conveyor system 54, controlled by control unit 56, moves pallet 30 to third pallet position $30_3$. (The control unit 56 provides instructions to all subsystems operating within the overall conveyor system 54, including the delivery mechanism 46, recirculating conveyor 44, reels $40_a$, $40_b$, reels $42_a$, $42_b$, reels $48_a$, $48_b$ reel 52, cutter and folding mechanism.) At third pallet position $30_3$, a plurality of extracted bicells 12 is deposited on alignment plate 36 via a delivery mechanism 46 controlled by a control unit 56. Use of alignment plate 36 disposed in pallet opening 32 allows deposition of bicells 12 accurately such that exposed grids 14 overlap with terminals $16_a$, $16_b$ to allow electrical connection. Control unit 56, cooperating with and coordinating recirculating conveyor 44 and conveyor system 54, defines means for depositing bicells 12 accurately in contact with terminals $16_a$, $16_b$.

Conveyor system 54, controlled by control unit 56, moves pallet 30 to a fourth pallet position $30_4$. At fourth pallet position $30_4$, control unit 56 causes a pre-determined portion of cover strip 18 material to be unwound from two reels $48_a$, $48_b$ and deposited on bicells 12, such that cover strip 18 overlaps with exposed grids 14; the bicells 12 have been deposited on terminals $16_a$, $16_b$ at position $30_3$. Control unit 56, cooperating with reels $48_a$, $48_b$ defines a means for depositing cover strip 18.

Additionally at position $30_4$, control unit 56 causes ultrasonic welding machines $50_a$, $50_b$ to weld together cover strip 18, bicell grids 14, and terminals $16_a$, $16_b$. Conveyor system 54, controlled by control unit 56 (having indexed positions $30_n$ of pallet 30), further indexes pallet 30 movement at four index points (not shown) at position $30_4$, these four index points being smaller than the larger indexed positions $30_n$. Therefore, welding machines $50_a$, $50_b$ spot weld cover strip 18, bicell grids 14, and terminals $16_a$, $16_b$ at four points along the length of the grid. Use of the conveyor system 54 to further index spot welding, improves accuracy, and improves time efficiency.

Conveyor system 54, controlled by control unit 56, moves pallet 30 to a fifth pallet position $30_5$. At fifth pallet position $30_5$, recirculating conveyor 44 removes alignment plate 36 from the receiving position disposed in pallet opening 32 and shuttles it back to its original position on the recirculating conveyor 44, the conveyor 44 being controlled by control unit 56, leaving the bicells 12 in contact with the terminals $16_a$, $16_b$ on pallet 30.

Recirculating conveyor 44 can be moved independent of conveyor system 54. Recirculating conveyor 44 controls a plurality of alignment plates 36, the plurality being equal to the number of positions $30_n$ beginning with position $30_2$ in which alignment plate 36 is moved to the receiving position with pallet 30, disposed about in pallet opening 32 and ending with position $30_5$ when alignment plate 36 is retracted from the receiving position. In a preferred embodiment, recirculating conveyor 44, controlled by control unit 56, moves alignment plate 36 into the receiving position at position $30_2$. Recirculating conveyor 44, controlled by control unit 56, moves alignment plate 36 to position $30_3$, alignment plate still in receiving position. Therefore, pallet 30, moved via conveyor system 54, and alignment plate 36 are in a configuration as described above for FIG. 3. At position $30_3$, bicells 12 are deposited and aligned by use of delivery mechanism 44. Recirculating conveyor 44, controlled by control unit 56, moves alignment plate 36 in receiving position to position $30_4$ where cover strip 18 is deposited and cover strip 18, bicell grids 14, and terminals $16_a$, $16_b$ are welded by ultrasonic welders $50_a$, $50_b$. Recirculating conveyor 44, controlled by control unit 56, moves alignment plate 36 to position $30_5$, at which position $30_5$, conveyor 44 retracts alignment plate 36 and shuttles alignment plate 36 back to beginning position $30_2$ on conveyor 44.

Conveyor system 54, controlled by control unit 56, moves pallet 30 to a sixth pallet position $30_6$. At sixth pallet position $30_6$, control unit 56 causes a sheet of packaging 20 to be unrolled from a reel 52 a pre-determined amount. Packaging material 20 is fed through pallet opening 32 such that welded bicells 12 are covered. Packaging sheet 20 is cut by cutter (not shown) a predetermined amount, leaving enough material that welded bicells 12 are covered underneath. Packaging is folded 20 by a folding mechanism (not shown) such that bicells 12 are enclosed in an envelope of packaging 20. Control unit 56, in cooperation with reel 52 and cutter and folding mechanism defines a means for enclosing packaging.

Figure 5:
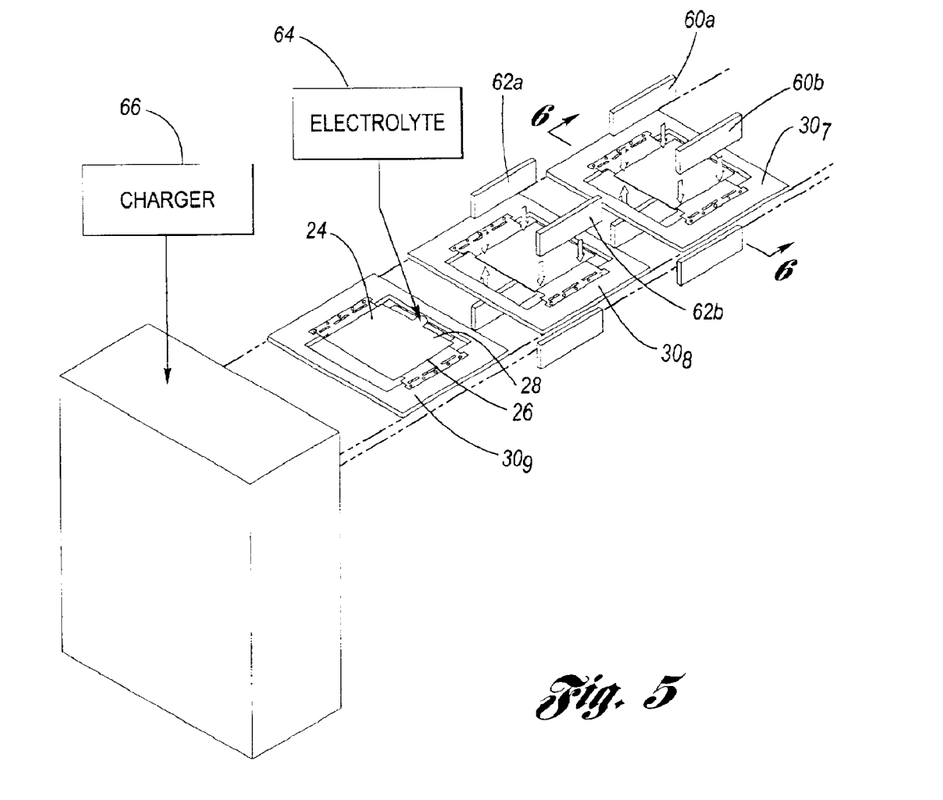
FIG. 5 is a perspective view of a second portion of the preferred embodiment.
Figure 6:
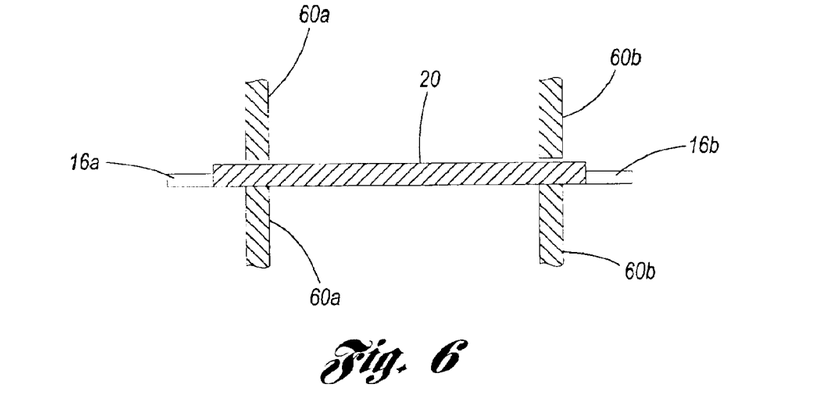
FIG. 6 is a section view taken substantially along lines 5—5 of FIG. 6, showing, in greater detail, the heated platens in a position to seal a storage battery.

As illustrated in FIG. 5, conveyor system 54, controlled by control unit 56, moves pallet 30 to a seventh pallet position $30_7$. At seventh pallet position $30_7$, control unit 56 causes heated platens $60_a$, $60_b$ to be moved to heat seal hot melt adhesive 22 of packaging 20 at sides 24, 26. Heated platens $60_a$, $60_b$ may be constructed of a metallic material, which aids in the rapid flow of heat. FIG. 5 best illustrates this sub-process. FIG. 5 illustrates a cross-sectional view of heated platens $60_a$, $60_b$, having upper and lower components, wherein heated platens $60_a$, $60_b$ are being pressed to packaging 20, thereby aiding in the sealing of packaging 20 so as to surround cover strip 18, exposed grids 14 of bicells 12, and further onto terminals $16_a$, $16_b$. Control unit 56, in cooperation with heated platens $60_a$, $60_b$ defines a means for sealing packaging 20.

Conveyor system 54, controlled by control unit 56, moves pallet 30 to a eighth pallet position $30_8$. At eighth pallet position $30_8$, sinking platens $62_a$, $62_b$ (i.e. for heat sinking) of the same design as heated platens $60_a$, $60_b$, are pressed to packaging 20 at sides 24, 26. This step aids in the quicker cooling of the hot seal seams of battery 10.

Optionally, conveyor system 54, controlled by control unit 56, moves pallet 30 to a ninth pallet position $30_9$. At ninth pallet position $30_9$, the electrolyte solution 64 may be introduced into the interior of battery 10 through a remaining open side 28, opposing packaging 20 fold. This step activates the electrical capacity of battery 10 by filling holes in the porous bicell 12 with electrolyte solution 64. Prior methods of activation have required use of special hardware fixtures or a glove box arrangement because a controlled environment was required. Preferably, an inventive in-line mechanism performs the extraction and activation steps that can be performed without a controlled chamber. This inventive fixture in-line mechanism is shown in co-pending application filed of even date herewith, assigned to common assignee, attorney docket number DP-305996, which this application hereby incorporates by reference in its entirety.

Figure 7:
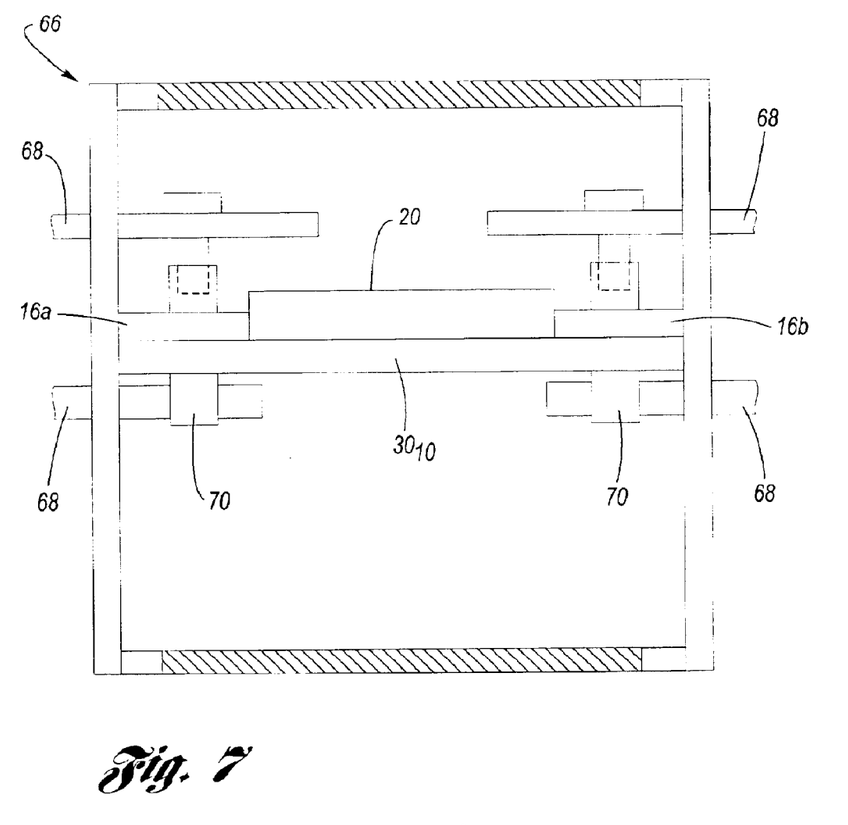
FIG. 7 is a schematic diagram of a charger rack for receiving a pallet with a battery for charging the assembled storage batteries.

Optionally, at a tenth pallet position $30_{10}$, battery 10 may be charged inserting the pallet on which it rests into a charger 66. This charging process is known as "formation". Charger 66 is best illustrated in FIG. 7. The charging process can occur while the battery 10 is still on pallet 30 on which battery 10 was constructed. The charging assembly 70 may be held in place by a spring and bolt assembly 68. Terminals $16_a$, $16_b$ may be connected to charging assembly 70 and battery charged through terminals $16_a$, $16_b$.

Figure 8:
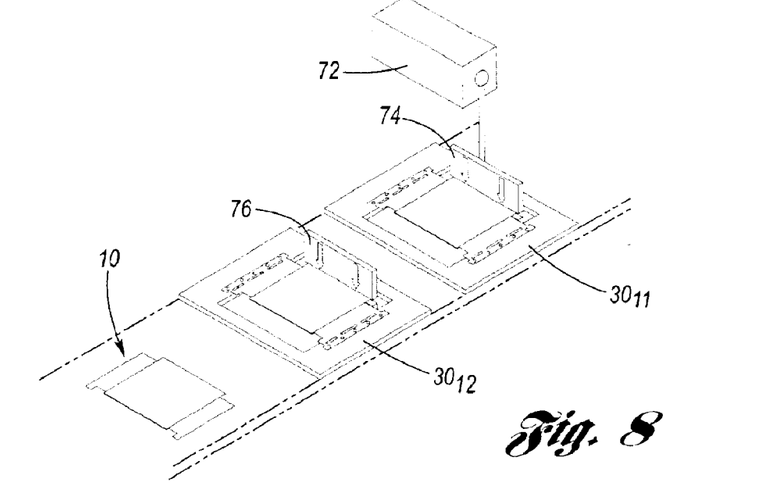
FIG. 8 is a perspective view of a third portion of the preferred embodiment.

Optionally, at an eleventh pallet position $30_{11}$, battery 10 is degassed by a conventional de-gassing mechanism 72. Additionally, seal along edge 28 (which had been broken for the charging process) is re-sealed using a heated platens 74.

Optionally, at a twelfth pallet position $30_{12}$, battery 10 is prepared as a final product wherein packaging 20 is trimmed using conventional means 76, carrier backing 17 is removed from terminals $16_a$, $16_b$, and battery 10 is removed from pallet.

It should be understood that each individual storage battery 10 is constructed on the pallet 30 on which terminals $16_a$, $16_b$ were originally deposited. Control unit 56 provides instructions to conveyor system 54 such that pallets 30 are shuttled along conveyor system 54 from station to station.

In an alternative embodiment, both reels $40_a$, $40_b$ do not have rolls of terminals $16_a$, $16_b$ but instead reel $40_a$ may contain a roll of terminals and reel $40_b$ may contain a roll of cover strip. Likewise, both reels $48_a$, $48_b$ do not have rolls of cover strip 18 but instead reel $48_a$ would contain a roll of cover strip 18 and reel $48_b$ would contain a roll of terminals $16_a$, $16_b$.

While the invention has been disclosed in terms of specific embodiments thereof, it is not intended to be limited thereto, but rather only to the extent set forth hereafter in the claims which follow.

What is claimed is:

1. A method of assembling a storage battery, comprising the steps of:
   (A) depositing terminals of said battery on a pallet at a first position;
   (B) moving said pallet to a second position; and
   (C) contacting said terminals with a plurality of bicells in said second position, wherein said bicells are aligned with one another and for contact with said terminals using an alignment plate.

2. The method of claim 1, wherein said alignment plate is disposed in an opening in said pallet such that edges of a top surface of alignment plate are elevated above edges of said pallet.

3. The method of claim 1, wherein said alignment plate is located on a continuous conveyor such that said alignment plate may be retracted after said bicells contact said terminals.

4. The method of claim 1, further comprising the step of depositing a cover strip in contact with overlap of said terminals and exposed grids of said bicells.

5. The method of claim 4, further comprising the step of ultrasonically welding said cover strip, said terminal, and said bicell exposed grids along said overlap.

6. The method of claim 1, further comprising the step of enclosing said terminals and said bicells with a packaging.

7. The method of claim 6, further comprising the step of sealing said packaging along the sides contacting said terminals via beating platens.

8. The method of claim 7, further comprising the step of cooling said battery by contacting said packaging sides in contact with said terminals with cooling platens.

9. The method of claim 7, further comprising the steps of:
   (A) injecting electrolyte solution into said bicells; and
   (B) sealing packaging side opposing packaging fold using heated platens.

10. The method of claim 1, further comprising the step of charging said battery by contacting said terminals to a charger.

11. The method of claim 1, wherein said terminals have a carrier backing.

12. The method of claim 1, further comprising the step of cutting said terminals from roll prior to moving said pallet to said second position.

13. The method of claim 4, wherein:
   (A) depositing of ones terminal is replaced by depositing of said cover strip; and
   (B) depositing of said cover strip is replaced with depositing of said one terminal.

14. A method of assembling a storage battery, comprising the steps of:
   providing a pallet having battery terminals disposed thereon, and
   contacting said terminals with at least one bicell, wherein said bicell is aligned for contact with said terminals using an alignment plate.

15. The method of claim 14, wherein said alignment plate is disposed in an opening in said pallet such that edges of a top surface of alignment plate are elevated above edges of said pallet.

16. The method of claim 15, wherein said at least one bicell comprises a plurality of bicells, wherein said alignment plate aligns said plurality of bicells with one another and with said terminals.

* * * * *

UNITED STATES PATENT AND TRADEMARK OFFICE
CERTIFICATE OF CORRECTION

PATENT NO. : 7,097,936 B2 Page 1 of 1
APPLICATION NO. : 09/940164
DATED : August 29, 2006
INVENTOR(S) : Benson et al.

It is certified that error appears in the above-identified patent and that said Letters Patent is hereby corrected as shown below:

Column 7, line 15, after "surface of" insert therein --said--.

Column 7, line 22, after "contact with" insert therein --an--.

Column 7, line 30, after "said packaging along" delete "the".

Column 7, line 31, after "via" delete "beating" and insert therein --heating--.

Column 8, line 3, after "sealing" insert therein --a--.

Column 8, line 3, after "opposing" insert therein --a--.

Column 8, line 11, after "from" insert therein --a--.

Column 8, line 14, after "depositing of" delete "ones" and insert therein --one of said--.

Column 8, line 27, after "surface of" insert therein --said--.

Signed and Sealed this

Ninth Day of January, 2007

JON W. DUDAS
*Director of the United States Patent and Trademark Office*